Sept. 3, 1968   B. M. WEDNER   3,399,802
QUICK-OPENING VALVE
Filed May 26, 1967   2 Sheets-Sheet 1

INVENTOR
BENJAMIN M. WEDNER

United States Patent Office 3,399,802
Patented Sept. 3, 1968

3,399,802
QUICK-OPENING VALVE
Benjamin M. Wedner, Pittsburgh, Pa., assignor to Gulf Research & Development Company, Pittsburgh, Pa., a corporation of Delaware
Filed May 26, 1967, Ser. No. 641,595
15 Claims. (Cl. 220—47)

ABSTRACT OF THE DISCLOSURE

A valve for substantially instantaneously transferring a relatively small quantity of fluid under a relatively high pressure utilizing a rupture disc. Means are provided to position the rupture disc in a passageway between two ports, to rupture the disc from outside the valve, and to provide quick and simple means to replace the rupture disc so that the valve may be used repeatedly and economically.

---

Figure 1:
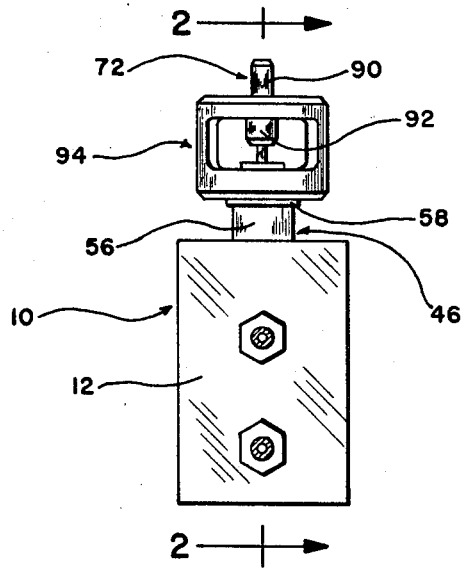

This invention relates broadly to the art of fluid transfer, and in its more specific aspects it relates to a quick opening valve adapted to substantially instantaneously transfer a relatively small amount of fluid under very high pressure.

The valve of the invention has been used in laboratory applications wherein it is necessary to transfer a small quantity of fluid from a storage bottle or the like, through the valve and to a test cell, or other point of use. It is required that the pressure in the test cell rise to substantially the full pressure of the fluid in the storage device as instantaneously as possible. It will be understood, however, that the valve of the invention is usable in applications outside the laboratory wherein it is necessary to effectuate a substantially instantaneous transfer of a very high pressure fluid.

Various valves are known in the art to accomplish this goal, but each of them suffers from certain disadvantages which are overcome by the valve of the present invention.

One such general type of device utilizes an explosive to break a rupture disc or a wall of the valve to open a passage. Devices of this type are generally used in so-called "one-shot" applications, such as fire extinguishers or aerospace applications. The very serious disadvantage of such devices is their high cost and the difficulty of renewal.

A second type of prior art device is the so-called "butterfly" valve wherein a substantially circular member is positioned in and seals a circular flow passage, is provided with weakened edge portions or the like, and is pivoted on a diameter or elsewhere on the circular member. In such valves, means are provided to break the weakened portions and cause the valve member to rotate about its support. The disadvantage is that a finite period of time is required for the valve member to pivot from the fully closed to the fully opened position. This time lag is intolerable in the applications in which the present invention is used. The time/pressure rise curve at the point of use is inherently an inclined or curved line, and not a substantially vertical line as with the present invention.

A third general type of device utilizes a frangible disc positioned in a flow passageway. The present invention is of this general type, but overcomes various disadvantages present in prior devices of the same class. Among these disadvantages is the provision of a piercing member which temporarily blocks a port during its disc piercing motion. This temporary blocking introduces a time lag in the transfer of pressurized fluid just as is experienced with the "butterfly" type. Another disadvantage is the provision of various sealing or gasketing means on the high pressure side between the frangible disc and its seat. Such additional sealing means are satisfactory in relatively low pressure applications, but would cause leaks if used at the high pressures at which the present invention is used. The additional sealing means also slow down the disc renewal operation.

Another disadvantage of prior devices of this general class is that they tend to be complex in mechanical structure which makes changing of the rupture disc a time consuming operation. In many such prior valves, various spring systems are provided to bias the piercing member to some position, and these springs further complicate the valve and increase the time required to replace the rupture disc. Another disadvantage of certain types of valves of this general class wherein the frangible member is provided with weakened portions to cause it to "flap" out of the flow passage rather than being ruptured, is that a finite time is required for the "flap" to open fully, and the remaining portions of the disc form a restriction in the flow passage.

Figures 3, 4, 5:
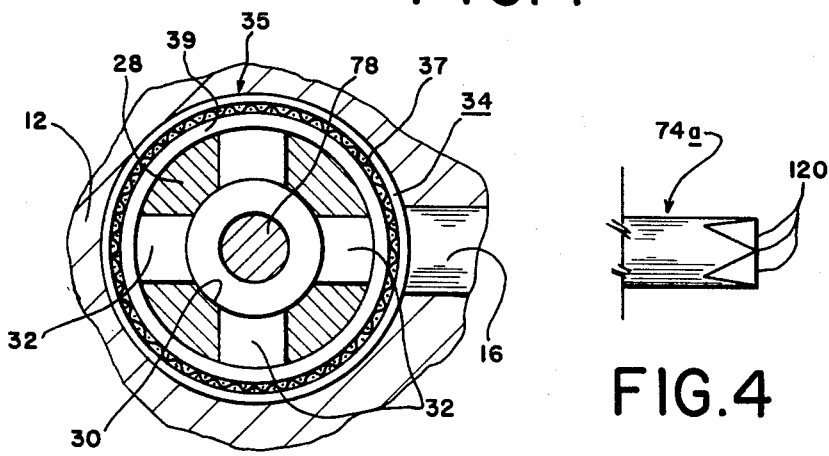
Figures 6, 7:
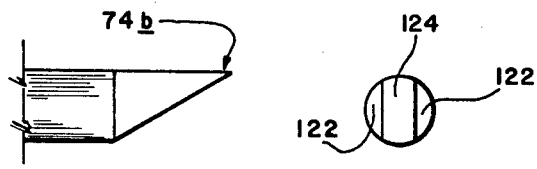
Figure 2:
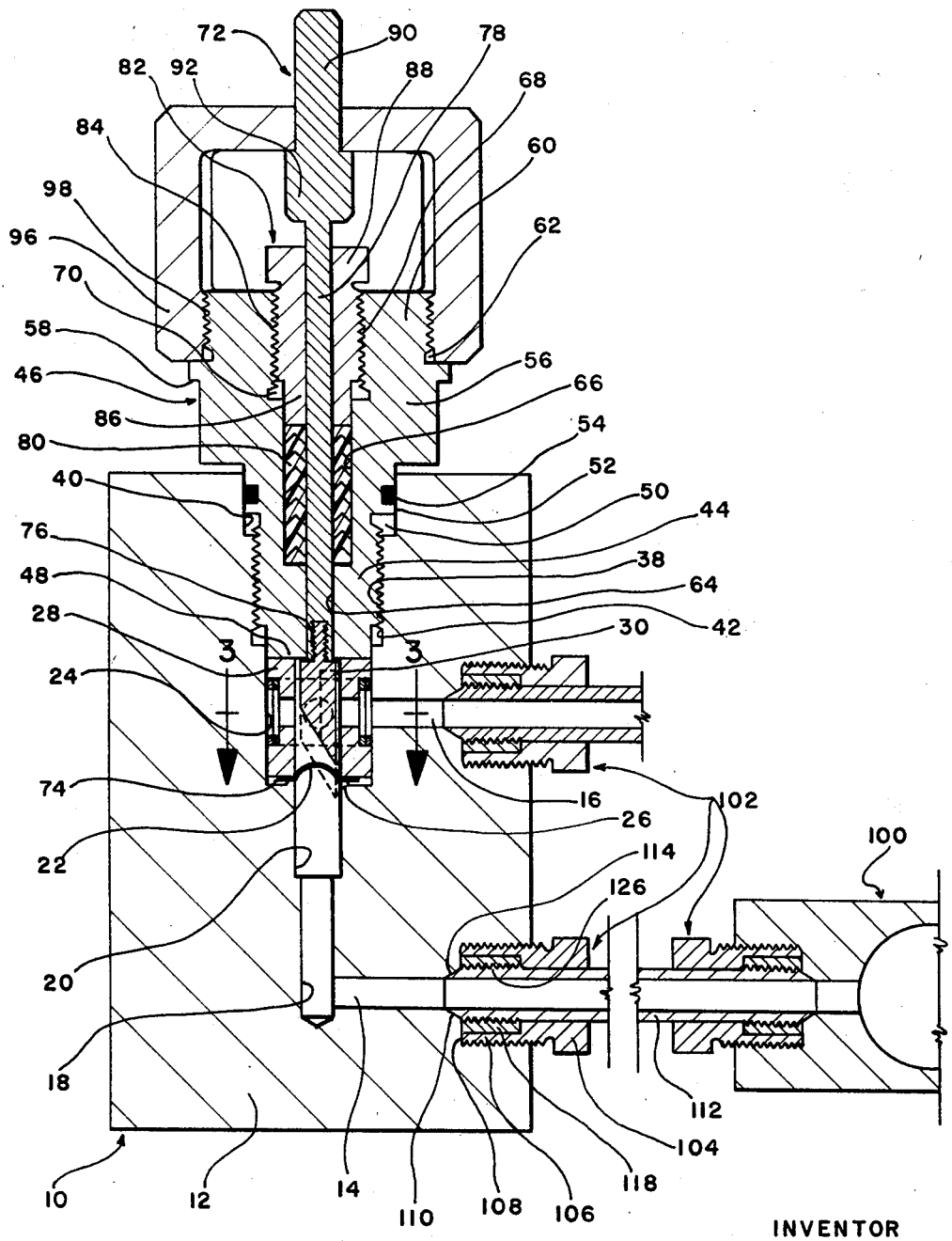

In the accompanying drawing forming a part of this disclosure: FIG. 1 is an end elevational view of a valve embodying the invention with the pressure bottle omitted; FIG. 2 is a side, cross-sectional, elevational view taken on line 2—2 of FIG. 1; FIG. 3 is a cross-sectional view taken on line 3—3 of FIG. 2; FIG. 4 is a partial side elevational view of a second embodiment of the piercing member; FIG. 5 is a front end view of the piercing member of FIG. 4; and FIGS. 6 and 7 are views similar to FIGS. 4 and 5 respectively of a third embodiment of the piercing member.

Referring now in detail to the drawing, 10 designates a valve embodying the invention. Valve 10 comprises a valve body 12, which may be formed from a solid block of any suitable material, such as alloy steel. Body 12 is formed with a pressurized fluid inlet port 14 and an outlet port 16.

The inner end of inlet port 14 communicates with the blind end of a passageway 18 formed in body 12. Passageway 18 is disposed in body 12 perpendicular to both ports 14 and 16 and in the plane defined by said ports, and is formed with an enlarged portion 20, for a reason that will appear below. The other end of enlarged portion 20 is sealed off by a rupture disc 22. Above disc 22, body 12 is formed with an enlarged passageway portion 24 which is coaxial with passageways 18 and 20. At the plane of juncture between passageways 20 and 24, body 12 is provided with an annular seat 26.

Rupture disc 22 is a commercially available item, and can be obtained calibrated for various rupture pressures. In the embodiment of the invention being described, disc 22 is made of stainless steel and is calibrated to hold 15,000 p.s.i. The disc 22 is formed with a flat, radially extending edge portion, and a hemispherical center portion positioned with its concave side to the pressure. The edge portion of the disc is seated on annular seat 26. Seat 26 is substantially circular in cross-section on one side to provide a substantially line contact with the disc. This contact is the only seal on the high pressure side.

Positioned within passageway 24 is a loose gland member 28. The lower annular end of gland member 28 is a flat, annular face and is in contact with the edge portion of disc 22. Thus, the rupture disc is held tightly in position at the upper end of passageway 20 by being wedged between seat 26 and the annular face of gland 28. The disc will be slightly scored by seat 26 when properly seated and sealed. The absence of any additional sealing or gasketing members at the seal permits the use of the present invention with very high pressures on the order of 15,000 p.s.i. The pressure side, the plane of juncture between seat 26 and disc 22, presents only one possible interface for fluid leakage, and the provision of the tight metal to metal sealing at said interface prevents leakage.

Gland member 28 is formed with a central opening 30 coaxial with and of substantially the same size as passageway 20. Gland 28 is of generally ring-like configuration, and a portion of its side wall is at the plane of outlet port 16. Said portion of the side wall of gland 28 is formed with a plurality of openings 32, four being shown for example purposes, see FIG. 3, which communicate central opening 30 with an annular ring-like recess 34. Any number of openings 32 may be provided, so long as the total cross-sectional area of all the openings 32 is at least as large as the cross-sectional area of enlarged passageway 20. The provision of ring-like recess 34 insures that unrestricted fluid flow communication will be maintained between central opening 30 and outlet port 16 in any position of gland 28 about its own axis when it is in position within the valve. This further simplifies the procedure for renewing the valve, i.e., replacing a spent rupture disc, since the operator need only drop the gland member onto the rupture disc.

Means may be provided to prevent any foreign matter, such as bits of a ruptured disc, from entering outlet port 16. To this end, a screen assembly 35 may be provided, and comprises a cylindrical screen 37 and upper and lower screen support rings 39. The entire screen assembly is within recess 34. A 100 mesh screen, made of stainless steel, with the rings made of carbon steel, has been found satisfactory in use. Screen 35 is mounted in recess 34 by spot welding at several places around the periphery of the gland, or by any other suitable means. Once in place, gland 28 with screen assembly 35 comprise one unit. The screen assembly is optional, since it may not be able to hold the high pressure flow at the upper end of the range of pressures with which the invention is used.

Coaxial with enlarged opening 24, body 12 is formed with an opening 38 formed with screw threads, and a thread run-out 42. A smooth walled opening 40, larger than threaded opening 38, joins threaded opening 38 with an outside surface of body 12.

Thus, a blind compound passageway comprising passageway portions 18, 20, 24, 38 and 40 is formed, which includes a flow passage between the ports 14 and 16 sealed off by the disc 22, (portions 18, 20 and 24) and which provides a seat for the remaining portions of the valve, as will be described below.

A threaded portion 44 of an adapter member 46 is threadedly mounted in threaded opening 38. Below threaded portion 44, adapter member 46 is formed with a reduced diameter lug portion 48 which bears against the upper surface of gland 28 to hold the gland tightly against the rupture disc 22. Above threaded portion 44, and joined thereto by a thread run-out 50, is a cylindrical wall portion 52 formed with a seat to receive sealing means 54, such as an "O" ring to form a tight seal in conjunction with smooth walled portion 40. Beyond portion 40, and positioned outside of the compound opening within body 12, adapter member 46 is formed with a nut portion 56. The upper end of nut portion 56 is formed with a seating shoulder 58, and the extreme outer end of adapter member 46 is formed into a reduced diameter threaded portion 60, which is joined to shoulder 58 by a thread run-out 62.

For purposes of slidably mounting a piercing member, as will be described below, adapter member 46 is formed with a composite through opening comprising a first smallest diameter portion 64 which extends through lug portion 48 and part of threaded portion 44. Extending from the inner end of portion 64 is a sealant receiving chamber portion 66. The remainder of the composite opening through adapter member 46 comprises a threaded portion 68, and is joined to chamber portion 66 by a thread run-out 70.

Means are provided to pierce rupture disc 22 to permit flow of the pressurized fluid from inlet port 14 to outlet port 16. To this end, a piercing member 72 is provided, which comprises a piercing tip 74 which is normally positioned within central opening 30 of gland member 28 closely adjacent the rupture disc. Thread means 76 or other suitable quick connecting means, are provided to selectively join the piercing tip 74 to a stem portion 78 of piercing member 72. Tip 74 substantially fills opening 30 in gland member 28 because a portion of the piercing tip thereby will be located adjacent the junction of the bowed or bellied portion and the outer flange portion of the rupture disc 22. In those applications wherein a rupture disc of the type shown is used, it has been found that by initiating destruction of the rupture disc, at or adjacent this junction, very efficient destruction of the disc is achieved to obtain the desired substantially instantaneous transfer of pressure.

Stem portion 78 passes through opening 64 in adapter member 46, and through sealant chamber 66. Sealing means 80 are positioned within chamber 66 to seal around stem 78. Sealing means 80 comprise a plurality of chevron type packing rings, made of Teflon or other suitable material, and a pair of end members to make a solid block of sealing means to fill chamber 66.

It should be borne in mind that sealing means 80 are located on the normally unpressured side of disc 22, and after the disc is ruptured, the pressurized fluid will pass through outlet port 16 to the point of use. The tests with which valve 10 is used are in the nature of surge tests wherein the length of time the pressurized fluid is needed at the point of use is very short, and hence the fact that the pressure is contained by sealing means 80 for this short period of time does not detract from the advantages of the invention. Since the "open" side of the V of the chevron type packing means are facing towards the pressure, the short duration pressure surge will tend to seal the chevrons still tighter in place. Means are provided to hold sealing means 80 under pressure around stem 78. To this end, a nut member 82 is provided and has a threaded portion 84 which mates with threads 68 in adapter member 46 to force a lug portion 86 against the top of sealing means 80. Nut member 82 is formed with a hex head 88 to facilitate its removal with conventional tools.

Piercer member 72 is provided with a striker head 90 which is joined to the end of stem portion 78 by a shoulder portion 92. Means are provided to guide striker head 90 in the downward piercing motion of the piercer. To this end, a cap member 94 is provided having an internal threaded portion 96 threadedly joined to suitable threads 98 on threaded portion 60 of adapter member 46.

Means are provided to make high pressure fluid tight seals between a source of high pressure fluid 100, such as a bottle or other suitable means, and inlet port 14, and between outlet port 16 and a point of use, not shown. To this end, a plurality of high pressure connectors 102 are provided. Each connector 102 comprises a nut member 104 having a right-handed threaded portion 106 which mates with suitable threads 108 in body 12. It will be understood that threads similar to threads 108 and seat 110 will also be formed in source 100 and at the point of use.

The outer end of each port is formed with a seat 110. A length of tubing 112 is formed with a tapered end 114 adapted to mate with seat 110. Rearwardly of tapered end 114, each end of connecting tubing 112 is formed with left-handed threads 116 for cooperation with a ferrule 118 which seats within a suitably formed cavity in nut 104 within the threaded end thereof.

High pressure connectors 102 are assembled by first slipping the nut member onto tubing 112 and away from the end of the tubing, threading ferrule 118 onto the threaded end of the tubing, then seating the tapered end of the tubing onto the seat 110, and finally screwing nut 104 onto threads 108 over the ferrule to form a fluid tight high pressure seal. The provision of opposite threads between the nut and the body member and between the ferrule and the tubing permits assembly of the nut on the ferrule without loosening the ferrule.

Referring to FIGS. 4 and 5, there is shown a second embodiment of the piercing tip 74 which is designated 74a. The tip 74 shown in FIG. 2 is a multiple point tip formed by four V-like notches in the body of the tip. The piercing tip 74a is provided with four radial cutting edges 120 in the cutting face of the tip.

Referring to FIGS. 6 and 7, a third embodiment 74b of the piercing tip is shown. Tip 74b is a "chisel" type and is formed with a pair of side flat faces 122 and a bias cut to form a chisel edge 124.

Each of the tips 74, 74a and 74b shown has been used, and they have been found to be of substantially equally good operating efficiency.

*Operation*

In operation, all the pressure fittings are made up between the valve, the source, and the point of use. At the moment the pressure surge is required at the point of use, striker head 90 is struck to drive the piercing tip through the rupture disc. The striker head may be struck with a hammer or in any other suitable manner, such as a heavy blow delivered by an automatic device under the control of an overall test control mechanism, or the like.

Since enlarged passageway portion 20 is larger than passageway portion 18, the cross-sectional area remaining through passageway 20 after the piercing tip 74 is positioned therein is substantially the same as the cross-sectional area of inlet port 14 and passageway 18. This structure insures that there will be no restriction to the flow of the pressurized fluid when the disc is ruptured.

An advantage of the present invention is the ease and speed with which the valve may be renewed for repeated tests. To replace the rupture disc, a simple tool, such as a wrench, is applied to nut portion 56 of adapter member 46 and the entire assembly of adapter member 46, striker member 72, cap member 94, nut member 82 and packing means 80 is lifted out of the valve as a unit. Gland 28, with its screen assembly, is then easily removed by the insertion of a thin tool or by turning the valve upside down. The spent rupture disc is removed in the same manner as the gland, and the valve is renewed by simply dropping a new rupture disc in place, dropping the gland on the disc, and remounting adapter member 46 in threaded opening 38, whereupon the valve is ready for another test by striking striker portion 90.

It is noteworthy that the valve remains connected to the source and the point of use and that only one screw thread connection must be unmade and remade to renew the valve. No parts of the valve must be re-calibrated from test to test. No springs are involved in urging the piercing member in either direction, and it will, in fact, automatically reposition itself as the adapter member and associated structure are screwed back into position.

While the invention has been described in detail above, it is to be understood that this detailed description is by way of example only, and the protection granted is to be limited only within the spirit of the invention and the scope of the following claims.

I claim:

1. A quick opening valve comprising a valve body, inlet and outlet port means in said body, means to communicate said inlet port means to a source of pressurized fluid, means to communicate said outlet port means to a point of use, said valve body being formed with a passageway interconnecting said inlet and outlet port means, a rupture disc, means to mount said rupture disc in said passageway between said inlet and outlet port means, said rupture disc comprising an edge portion, said rupture disc mounting means comprising a rupture disc seat formed in said interconnecting passageway in contact with one side of said rupture disc edge portion, said rupture disc mounting means further comprising a loose gland member positioned within said interconnecting passageway, and formed with an end face in contact with the opposite side of said rupture disc edge portion, whereby said rupture disc may be held within said passage to form a fluid tight seal between said inlet and outlet port means by said seat and said face of said gland member on opposite sides of and in contact with said rupture disc, piercing means, means to mount said piercing means in said passageway on the outlet port side of said rupture disc, and said piercing means mounting means comprising means to position a portion of said piercing means outside of the valve, whereby said rupture disc may be ruptured by a blow applied to said outside positioned portion of said piercing means.

2. The combination of claim 1, said rupture disc seat comprising a substantially circular cross-section, whereby a line contact seal is established between said seat and said disc.

3. The combination of claim 1, said inlet and outlet port means extending from one face of said valve body to said passageway, said passageway having a blind end within said valve body, the other end of said passageway extending out to a second face of said valve body, an adapter member, means to mount a portion of said adapter member in said other end of said passageway, said piercing means mounting means comprising a portion of said adapter member, and said adapter member comprising an end annular face adapted to contact an opposite end annular face of said gland member, whereby said rupture disc is held between said first mentioned end face of said gland member and said valve seat by pressure exerted by said adapter member on said opposite end annular face of said gland member.

4. The combination of claim 1, one end of said passageway interconnecting said inlet and outlet port means terminating within said valve body and the opposite end of said passageway extending out to an outside face of said valve body, adapter means, means to mount said adapter means in said extending end of said passageway, said piercing means mounting means comprising a portion of said adapter means, said adapter means comprising means to urge said loose gland member towards said valve seat to hold said rupture disc within said passageway to form said fluid tight seal, whereby said rupture disc may be replaced by removing only said adapter means and said loose gland member from the valve.

5. The combination of claim 4, said adapter means comprising an adapter member, said urging means of said adapter member comprising an end face thereof adapted to contact an opposite end annular face of said gland member to seal said rupture disc between said gland member and said seat.

6. The combination of claim 5, said adapter member being formed with a longitudinal through opening to receive said piercing means, said opening being formed with an enlarged portion, sealing means within said enlarged portion and surrounding said piercing means, and a nut member seated within said adapter member to compress said sealing means around said piercing means.

7. The combination of claim 6, said sealing means comprising chevron type sealing rings formed of Teflon.

8. The combination of claim 6, a cap member, thread means to threadedly connect said cap member to said adapter member, said cap member being formed with an opening axially aligned with said piercing means, and said outside extending portion of said piercing means passing through said opening in said cap member, whereby said piercing means is guided by said opening in said cap member during its piercing motion.

9. The combination of claim 1, said gland member being of generally ring-like configuration, said gland member comprising means to insure fluid flow communication between the central opening of said gland member and said outlet port means in any position of said gland member about its longitudinal axis when said gland member is in contact with said rupture disc, said fluid flow communication means comprising a ring-like recess formed in the outermost portion of the side wall of said gland member positioned substantially at the plane of said outlet port means and a plurality of radial openings communicating said recess with the central longitudinal opening of said gland member.

10. The combination of claim 9, and screen means in said ring-like recess of said gland member.

11. The combination of claim 9, and the difference between the cross-sectional area of said longitudinal opening of said gland member and the cross-sectional area of said piercing means being substantially equal to the cross-sectional area of said passageway on the inlet port means side of said rupture disc.

12. The combination of claim 1, said piercing means comprising a stem portion having one end connected to said outside extending portion, a piercing tip, and thread means to connect said piercing tip to the other end of said stem portion.

13. The combination of claim 12, said piercing tip comprising an elongated cylindrical metallic member cut on the bias with respect to the longitudinal axis thereof, to form a piercing edge.

14. The combination of claim 12, said piercing tip comprising an elongated cylindrical metallic member formed with a plurality of cutting edges.

15. The combination of claim 12, said piercing tip comprising an elongated cylindrical metallic member cut on the bias with respect to the longitudinal axis, and cut on both sides of said bias cut to form a chisel-like edge.

References Cited
UNITED STATES PATENTS

| | | | |
|---|---|---|---|
| 3,087,643 | 4/1963 | Smirra | 220—47 |
| 3,093,151 | 6/1963 | Merkowitz | 137—68 |

THERON E. CONDON, *Primary Examiner.*

G. T. HALL, *Assistant Examiner.*